(12) United States Patent
Chen et al.

(10) Patent No.: US 9,893,523 B2
(45) Date of Patent: Feb. 13, 2018

(54) SYSTEMS, METHODS AND APPARATUS FOR IMPROVED REGULATION OF ENERGY DELIVERY SYSTEMS

(71) Applicant: Siemens Industry, Inc., Alpharetta, GA (US)

(72) Inventors: Dingguo Chen, Eden Prairie, MN (US); Michael E. York, Rogers, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 391 days.

(21) Appl. No.: 14/666,432

(22) Filed: Mar. 24, 2015

(65) Prior Publication Data
US 2016/0149409 A1 May 26, 2016

Related U.S. Application Data

(60) Provisional application No. 62/082,799, filed on Nov. 21, 2014.

(51) Int. Cl.
*G05B 15/02* (2006.01)
*H02J 3/14* (2006.01)
*H02J 3/48* (2006.01)

(52) U.S. Cl.
CPC .............. *H02J 3/14* (2013.01); *G05B 15/02* (2013.01); *H02J 3/48* (2013.01)

(58) Field of Classification Search
CPC ............. G05B 15/02; H02J 3/14; H02J 3/48
USPC ........................................................ 700/295
See application file for complete search history.

(56) References Cited

U.S. PATENT DOCUMENTS

| 7,454,270 | B2 | 11/2008 | Mansingh et al. |
| 7,536,240 | B2 * | 5/2009 | McIntyre .................. H02J 3/00 700/286 |
| 8,457,801 | B2 * | 6/2013 | Currie ..................... H02J 3/005 700/291 |
| 9,651,973 | B2 * | 5/2017 | Forbes, Jr. ................ G05F 1/66 |
| 2004/0260489 | A1 * | 12/2004 | Mansingh ............. G06Q 50/06 702/60 |

(Continued)

FOREIGN PATENT DOCUMENTS

| JP | 2013240229 A | 11/2013 |
| JP | 5465816 B1 | 4/2014 |

OTHER PUBLICATIONS

European Search Report dated Apr. 4, 2016 corresponding to European Application No. 15193256.3, filed Nov. 5, 2015 (10 pages).

(Continued)

*Primary Examiner* — Chun Cao

(57) ABSTRACT

Embodiments provide systems, methods and apparatus for controlling an energy delivery system including providing an energy management system (EMS) having an automatic generation control (AGC) system including a load frequency control (LFC) module and an economic dispatch (ED) module; determining a regulation requirement based upon a predefined set of nested system control zones and a current area control error (ACE); determining regulation allocation based on a pre-defined set of gain factors associated with the nested system control zones; and implementing corrections to the operation of the energy delivery system based upon solution results of the determined regulation allocation. Numerous other aspects are provided.

16 Claims, 6 Drawing Sheets

(56) References Cited

U.S. PATENT DOCUMENTS

2007/0038335 A1 2/2007 McIntyre
2015/0280435 A1* 10/2015 Metcalfe ................ G06Q 50/06
700/295

OTHER PUBLICATIONS

Demello, F. P. et al. "Automatic Generation Control Part II—Digital Control Techniques" pp. 716-724.
Bevrani, Hassan et al. "Automatic Generation Control (AGC): Fundamentals and Concepts" Intelligent Automatic Generation Control, pp. 11-36, 2011.
Glavitsch, H. et al. "Automatic generation control" 1980 IPC Business Press.

* cited by examiner

SYSTEMS, METHODS AND APPARATUS FOR IMPROVED REGULATION OF ENERGY DELIVERY SYSTEMS

RELATED APPLICATIONS

The present application claims priority to U.S. Provisional Application No. 62/082,799 titled "Progressive, Economic Regulation Allocation with Minimum Unit Movements" filed Nov. 21, 2014, which is incorporated herein by reference for all purposes.

FIELD

The present invention relates to operating energy delivery systems, and more specifically to improved regulation of such systems.

BACKGROUND

An energy management system (EMS) is a system of computer implemented tools used by operators of electric utility grids to monitor, control, and optimize the performance of the generation and/or transmission of an energy delivery system. In other words, an EMS optimizes, supervises and controls the transmission grid and generation assets. The monitoring and control functions are known as "supervisory control and data acquisition" (SCADA). Primary frequency control involves autonomous automatic actions by the EMS to arrest deviations in power system frequency whenever imbalances arise between load and generation. Primary frequency control actions are fast; They are measured in megawatt (MW)/seconds. Primary frequency control actions include governor response, load, damping, and voluntary frequency-responsive load control, all of which contribute to frequency response. Secondary frequency control involves centrally coordinated actions by the EMS to return frequency to its scheduled value. Secondary frequency control actions are slower than primary frequency control actions; they are measured in MW/min. They are deployed both during normal operations and after primary frequency control resources have arrested frequency following major disturbances. Secondary frequency control actions include generation (or load) that responds to automatic generation control (AGC) signals or to operator dispatch commands. AGC is often referred to as "regulation" service.

Area Control Error (ACE) is the difference between scheduled and actual electrical generation within a control area on the power grid, taking frequency bias into account. To elaborate, generating an amount of electricity in exact equilibrium with consumption (load), is extremely difficult and also quite impractical. Instead, generation controllers strive to continually alternate between over- and under-generating. For instance, in a particular control area, the generation dispatcher's official target might be to cross the break-even point (i.e., a zero ACE value) fifteen times per hour.

The formula for calculation of ACE is as follows:

$$ACE=(NI_A-NI_S)-10b(F_A-F_S)T_{ob}+I_{ME}$$

Where,
$NI_A$ represents actual net interchange (MWs)
$NI_S$ represents scheduled net interchange (MWs)
b represents the control area's frequency bias setting (MW/0.1 Hz)
$F_A$ represents actual system frequency (Hz)
$F_S$ represents scheduled system frequency (60.0 Hz in America)
$T_{ob}$ represents scheduled interchange energy used to bilaterally correct inadvertent, accumulations (MWs)
$I_{ME}$ represents a manually entered amount to compensate for known equipment error (MWs)

For a typical energy management system (EMS), the main objectives of Automatic Generation Control (AGC) are to regulate the active power output of generating units; maintain the desired net interchange; maintain interconnected system frequency; dispatch generating units in an optimal manner to minimize production cost; monitor and maintain sufficient available system reserves to meet system reserve requirements. A common problem/concern is the excessive unit movements during generation control and dispatch to maintain power balance and regulate frequency close to a desired frequency level (e.g., nominal frequency). Therefore, what is needed are systems, methods and apparatus for improved regulation of such energy delivery systems.

SUMMARY

In some embodiments, a method of controlling an energy delivery system is provided. The method includes providing an energy management system (EMS) having an automatic generation control (AGC) system including a load frequency control (LFC) module and an economic dispatch (ED) module; determining a regulation requirement based upon a predefined set of nested system control zones and a current area control error (ACE); determining regulation allocation based on a pre-defined set of gain factors associated with the nested system control zones; and implementing corrections to the operation of the energy delivery system based upon solution results of the determined regulation allocation.

In other embodiments, an energy management system (EMS) is provided. The EMS includes a process controller; and a memory coupled to the process controller and storing instructions executable on the process controller, the instructions operable to determine a regulation requirement based upon a predefined set of nested system control zones and a current area control error (ACE); determine regulation allocation based on a pre-defined set of gain factors associated with the nested system control zones; and implement corrections to operation of an energy delivery system based upon solution results of the determined regulation allocation In still other embodiments, a load frequency control (LFC) module within an automatic generation control (AGC) system is provided. The LFC module includes a LFC application operative to execute on a process controller to generate an output data structure and to store solution results in an operational database of an EMS; and a regulation optimization engine operable to execute on the process controller to receive input data, execute functions called by the LFC application for allocating area regulation among area regulating units, and to populate the output data structure with solution results, wherein biased effective limits of each potential regulating unit are calculated during economic allocation of regulation.

Numerous other aspects are provided in accordance with these and other aspects of the invention. Other features and aspects of the present invention will become more fully apparent from the following detailed description, the appended claims and the accompanying drawings.

DESCRIPTION

Figure 1:
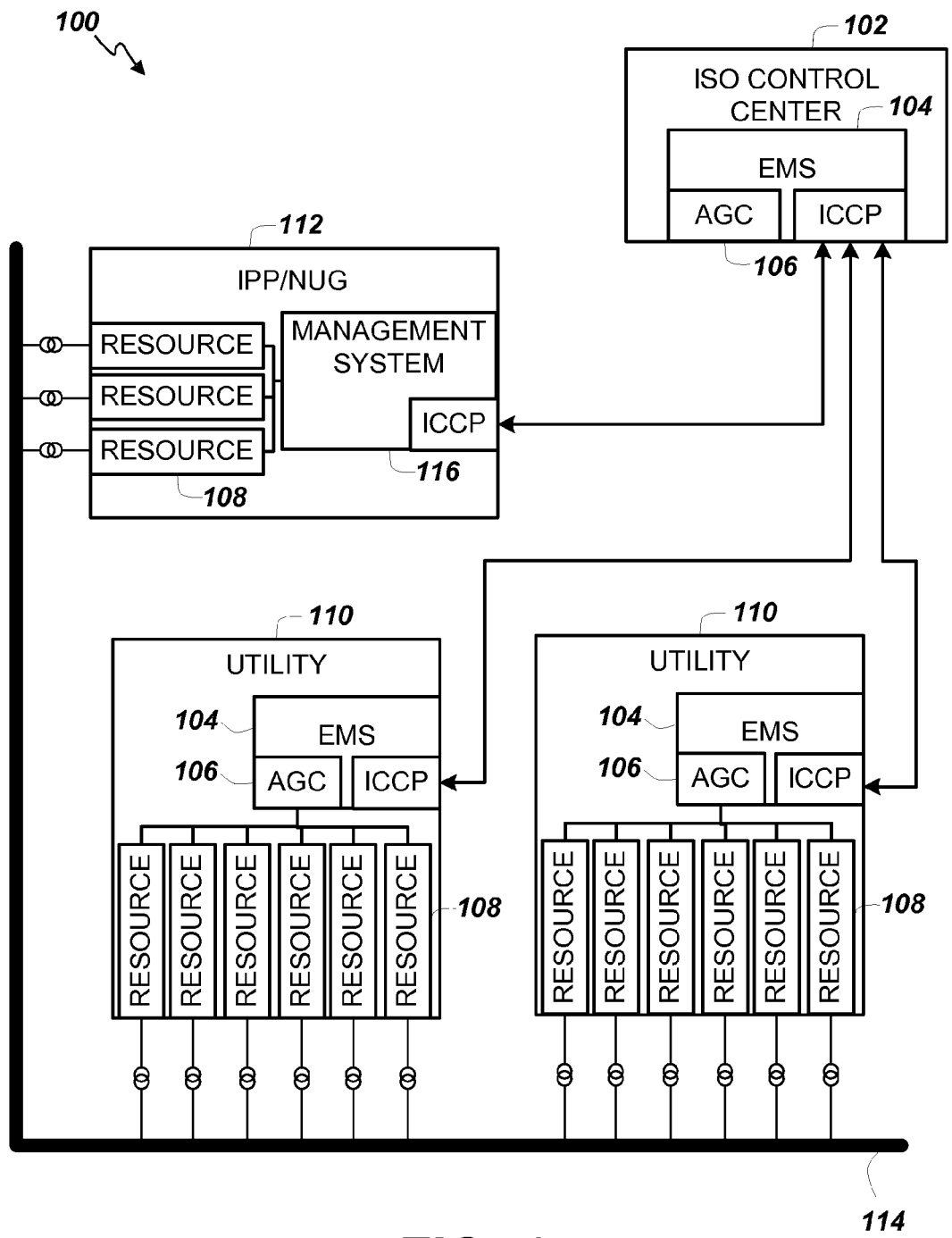
FIG. 1 is a block diagram depicting a portion of an example energy delivery system according to embodiments of the present invention.

Embodiments of the present invention provide systems, apparatus and methods for an improved energy management system (EMS) for electricity delivery, or more generally, energy delivery systems. Embodiments of the present invention include software applications and systems adapted to provide an enhanced automatic generation control (AGC) system via improvements to a load frequency control (LFC) module and an economic dispatch (ED) module. The improvements provide enhancements for control and dispatch of generating units to reduce unit movements (e.g., power output adjustments). The LFC module is responsible for determining desired system regulation and proper regulation allocation among regulating units. The ED module is responsible for assigning most economic basepoints to dispatchable generating units.

The LFC module is a cyclical running program with a generation control cycle time of a few seconds (e.g., 2 seconds, 4 seconds, 6 seconds). Embodiments of the present invention enhance the LFC module so that it can reduce regulation using a progressive, multi-tier smoothing control mechanism, economically allocate system regulation among regulating units and yet still help reduce ACE and reduce the number of units' up/down movements.

The ED module is a cyclical running program (e.g., executes every 2, 3, or 4 minutes) that supports three different dispatch passes: a Control Pass, an Advisory Pass and a Target Pass. For real time dispatch purposes, embodiments of the present invention enhance the ED module's Control Pass so is able to move generating units in a manner that achieves optimal economics, and yet still helps reduce ACE and reduce the number of units' up/down movements.

In other words, these enhancements are responsible for determining the appropriate amount of system regulation required for regulating area frequency and interchange; computing generating units' biased effective limits in a manner to prevent generating units from moving in a direction that increases ACE; economically allocating area regulation among a minimum number of participating regulating units depending upon regulating ranges and units' regulation contribution type; and incorporating area regulation in system desired generation to be dispatched and utilizing generating units' biased effective limits and determining generating units' economic basepoints.

Embodiments of the present invention provide an enhanced AGC with an LFC module and an ED module that together support a new approach of regulation determination and allocation, and basepoint determination with several novel features. The control area's regulation requirement is determined based on several factors. ACE levels are a factor that corresponds to several nested system control zones. These include a No-Regulation Zone, a Regulating Zone, a Permissive Zone, and an Emergency Zone. When ACE is inside the No-Regulation Zone, the system generation is entirely dispatched either economically, or manually, or on schedule; but no regulation is required and allocated. When ACE progresses out the No-Regulation Zone, it enters into the Regulating Zone where active power regulation takes place to smoothly, progressively move units to bring the system to a desired system condition. When ACE further progresses out the Regulating Zone, it enters into the Permissive Zone where any movements of generating units that deteriorate ACE will be blocked. When ACE further progresses out the Permissive Zone, it enters into the Emergency Zone where non-regulating units will also be assigned regulation to bring system back to the normal operating conditions as quickly as possible.

In addition, several tunable gain factors associated with different levels of ACE are used to smoothly allocate regulation among regulating units. The tunable gain associated with the Emergency Zone serves the purpose of bringing the system back to a normal system operating condition in the least amount of time. The tunable gain associated with the Permissive Zone serves the purpose of bringing the system back to the Regulating Zone. The tunable gains associated with the Regulating Zone serves the purpose of progressively, smoothly bringing the system to the No-Regulation Zone. Other factors used include properly filtered ACE including averaging ACE over a configurable time period and system load trend in the next couple of (e.g., 2, 3, 4, 5, 6) minutes.

In some embodiments, a core optimization engine is embedded inside the LFC module and allocates the area regulation among the regulating units. During economic allocation of regulation, a configurable option on the control area level is provided in some embodiments to indicate whether or not regulation needs to be allocated in a direction that will help ACE. During economic allocation of regulation, the biased effective limits of each potential regulating unit are calculated in some embodiments.

In some embodiments, the area regulation is allocated based on the units' designation for regulation. A unit that contributes regulation may be designated as a regulating unit or an assisted regulating unit. A regulating unit typically has normal regulating range, which will be filled first before its maximum regulating range is used when the normal regulating ranges of all the regulating units are all filled up and there is still remaining regulation to be allocated. The assisted regulating units will be used when the total regulation contribution from all the regulating units is not sufficient to meet the area regulation. This three-step checking process does the following sequentially. First, check if those regulating units with normal regulating ranges are sufficient to provide required regulation within normal regulating ranges. Units' ramp rates are also considered during this checking process. Second, if the normal regulating ranges are insufficient, check if those regulating units are sufficient to provide required regulation within their boosted regulating ranges. Third, if the boosted regulating ranges are not sufficient, those assisted regulating units will be included in the economic allocation of regulation.

In some embodiments, once the minimum number of units eligible to provide required system regulation is determined, the required system regulation is economically allocated among these units. This is done in the core optimization engine embedded inside the LFC module.

During the cyclical ED execution, the total system desired generation to be dispatched that contains a component of system regulation is dispatched among those economic generating units. The basepoints of these economic generating units are determined. Even non-regulating units may have their basepoints adjusted by the ED module.

During the cyclical ED module execution, the same configurable option as for the regulation allocation is also applied to indicate whether or not generation needs to be allocated in a direction that will help ACE. During the cyclical ED module execution, the biased effective limits of each participating economic generating unit are calculated. In some embodiments, plant/group limits are included when enabled. Unit limits and response rates are respected and unit prohibited regions are considered.

Turning now to FIG. 1, a portion of an example energy deliver system 100 according to embodiments of the present invention is provided. Independent System Operators (ISO) 102 operate control centers that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100. Some embodiments of the present invention can be implemented within existing commercially available EMS products such as the Spectrum Power 3™ and the Spectrum Power TG™ Energy Management Systems manufactured by Siemens Industry, Inc. of Washington, D.C.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG) 112, etc.), in response to changes in the load created by consumers of the electricity. The generated power is delivered from the resources 108 to consumers via transmission lines 114. Note that the utilities 110 can include an EMS 104 with an AGC system 106. IPPs and/or NUGs 112 can allow the ISO's AGC system 106 to control the IPPs' and/or NUGs' resources 108 but will include at least some form of management system 116.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, and other generation types, and constraints related to the stability of the system and capacity of interconnections to other power grids.

Figure 2:
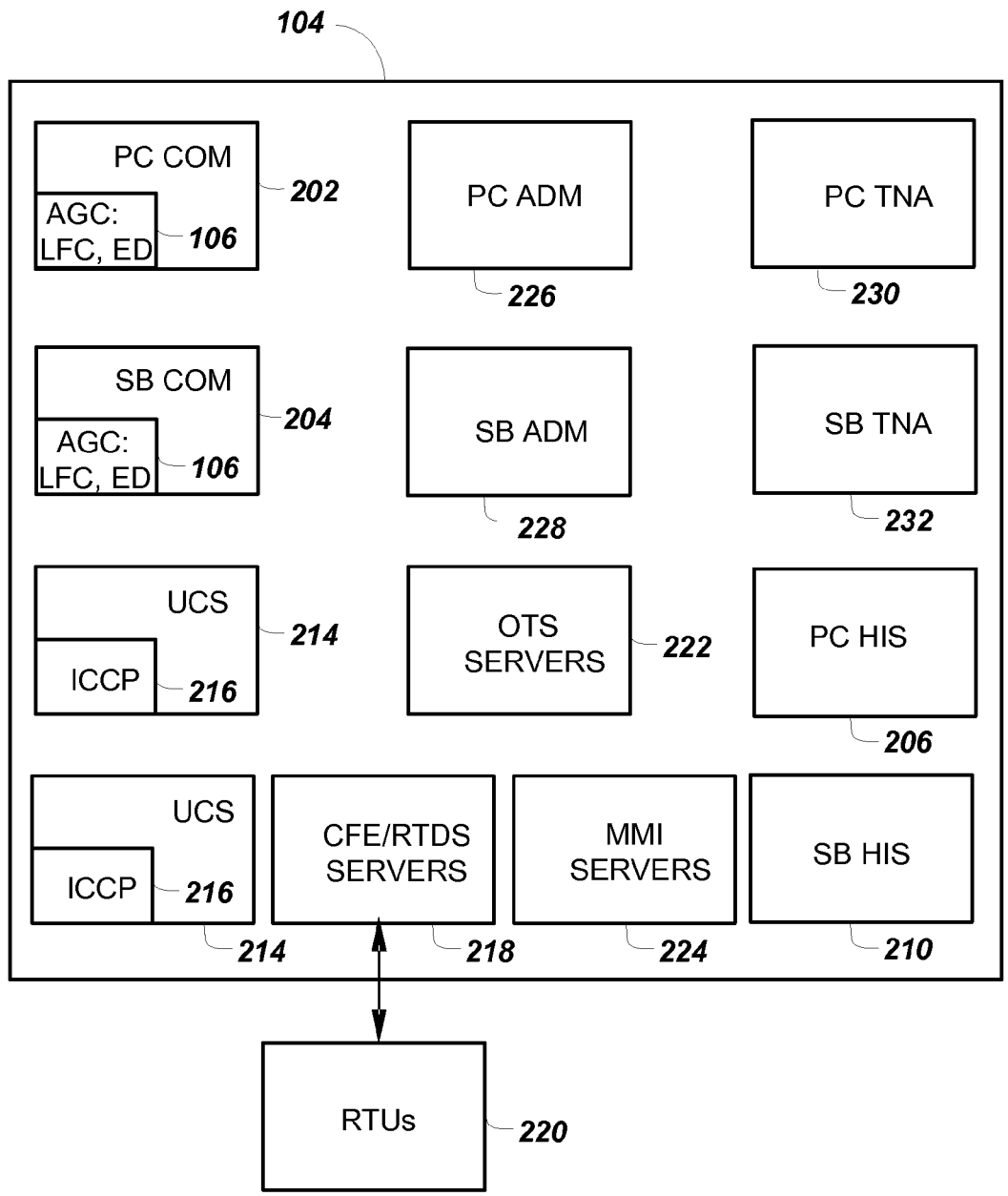
FIG. 2 is a block diagram of details of an example energy management system according to embodiments of the present invention.

Turning now to FIG. 2, an example configuration of an EMS 104 (e.g., an EMS 104 operated by an ISO) that supports operation of an improved AGC system 106 according to embodiments of the present invention is shown. The AGC system 106 includes a Load Frequency Control (LFC) module and an Economic Dispatch (ED) module that implement features of embodiments of the present invention, the functions of which are described in detail below. The AGC system 106 can be implemented within a Process Controller (PC) server 202 that also includes Communicator (COM) functionality. The EMS 104 can include redundant back-up servers to provide higher reliability and fault-tolerance. Thus, a Standby (SB) server 204 is also provided in some embodiments. A PC server 206 that implements a Historical Information System (HIS) and a SB server 210 that implements a back-up HIS can be included in the EMS 104.

EMS 104 further includes one or more Utility Communication Servers 214 that each provide an implementation of an Inter-Control Center Communication Protocol (ICCP) 216 that enables communication with, for example, other EMSs in operation at, for example, several utilities 110 (FIG. 1). In some embodiments, ICCP 216 can be used to implement remote control of resources 108 (FIG. 1) by implementing AGC system 106 communications between different EMSs. The EMS 104 also includes a communication front end (CFE)/Real Time Data Server (RTDS) 218 to facilitate communications with external entities and users via remote terminal units (RTUs) 220. Note that RTUs 220 are part of the power utilities' field devices, for example.

In operation, the ISO clears the real time market through its market optimization engine and then ISOs dispatch instructions along with ancillary service awards (e.g., regulation, reserves, etc.) to individual power utilities through a transport mechanism (e.g., ICCP 216). The power utilities receive the dispatch instructions (e.g., via ICCP 216) and then make use of their AGC system 106 to compute a power setpoint command for each AGC cycle for the resources under AGC control (i.e., AGC units). Next, the setpoints are updated to SCADA and they are then sent to the utilities' RTUs 220 via the CFE/RTDS 218. There are dedicated RTU lines that connect the RTUs to the CFE/RTDS 218 via, e.g., modems. Typically, RTUs are geographically located in the utilities' substations and hardwired to the resources (e.g., generators). The various applications such as, for example, AGC system 106, SCADA, CFE/RTDS 218, and ICCP 216 are part of EMS 104. The RTUs 220 are field devices that are capable of sending telemetry to ISO EMS 104 and can also receive megawatt (MW) setpoints from the ISO EMS 104 to control resources (e.g., generators).

In some embodiments, the EMS 104 can also include a number of additional servers and applications. For example, the EMS 104 can include Operator Training Simulator (OTS) servers 222, Man-Machine Interface (MMI) servers 224, a PC Administration (ADM) application server 226, a SB ADM application server 228, a PC Transmission Network Application (TNA) 230, and a SB TNA 232.

In some embodiments, the functions of the LFC module can be implemented in several function modules. These modules work together in a coordinated manner as will be described below. The function modules can include a System Control Mode Determination module that determined the system control mode based on the current ACE level. Another function module that can be included is an Advanced Proportional-Integral (PI) Control module. When the system control mode is transitioned into and stays in the System Basepoint Control Mode, there is no area regulation required. When the system control mode is transitioned out of the System Basepoint Control Mode, the PI control takes an enhanced form depending on the system control mode as will be described in detail below.

Alternatively, a Progressive Multiple Gain Proportional Control module can be provided. When the system control mode is transitioned into and stays in the System Basepoint Control Mode, there is no area regulation required. When the system control mode is transitioned out of the System Basepoint Control Mode, the proportional control takes an enhanced form depending on the system control mode as will be described below in detail. A difference between this approach and the Advanced PI Control is that with this alternative approach, the integration of ACE is not performed, and is simpler and more responsive, but does not correct the error accumulated in the past.

An Economic Allocation of Regulation module can be provided. The system regulation is determined in a dedicated manner in which system load ramp rate and interchange schedule change are also factored. The system regulation are distributed among all online participating regulating units in an optimal manner in which ACE direction is consider, system production cost is minimized and the direction of participating generating unit's movement direction is harmonized.

The improved ED module also includes several novel function modules as will be detailed below. These modules work together in a coordinated manner. A System Regulation Adjustment module determines the desired regulation amount adjusted by the current system load ramp rate and interchange schedule change. A Biased Effective Limits Calculation module can be provided. The economic dispatch of system total generation respects the unit's effective limits and therefore automatically guarantees that the unit's basepoint movements will reduce ACE.

In order to achieve the objectives of economically dispatch generating units among economically dispatchable generating units and economically allocating regulation among regulating units and yet incur the only the minimum number of generating units movements (e.g., corrections), two sets of algorithmic procedures are provided by embodiments of the present invention and these procedures work together in a coordinated manner.

The functions of the LFC module listed above are now described in detail. The System Control Mode Determination module determines the system control mode based on the current ACE level. Nested System Control Zones are used. The nested system control zones are specified by the following quantities:

$BC_{max}$, $BC_{min}$, $BC_{db}$; $RC_{max}$, $RC_{min}$, $RC_{db}$; $PC_{max}$, $PC_{min}$, $PC_{db}$ where $$BC_{db} > 0, RC_{db} > 0, PC_{db} > 0;$$

$$PC_{min} + PC_{db} < RC_{min} + RC_{db} < BC_{min} + BC_{db} < 0;$$

$$0 < PC_{max} - BC_{db} < PC_{max} - RC_{db} < PC_{max} - PC_{db};$$

$BC_{max}$, $BC_{min}$, $BC_{db}$ designate the upper limit, the lower limit and the deadband (applied to these two limits) of the System Basepoint Zone;

$RC_{max}$, $RC_{min}$, $RC_{db}$ designate the upper limit, the lower limit and the deadband (applied to these two limits) of the System Regulating Control Zone;

$PC_{max}$, $PC_{min}$, $PC_{db}$ designate the upper limit, the lower limit and the deadband (applied to these two limits) of the System Permissive Control Zone.

Figure 3:
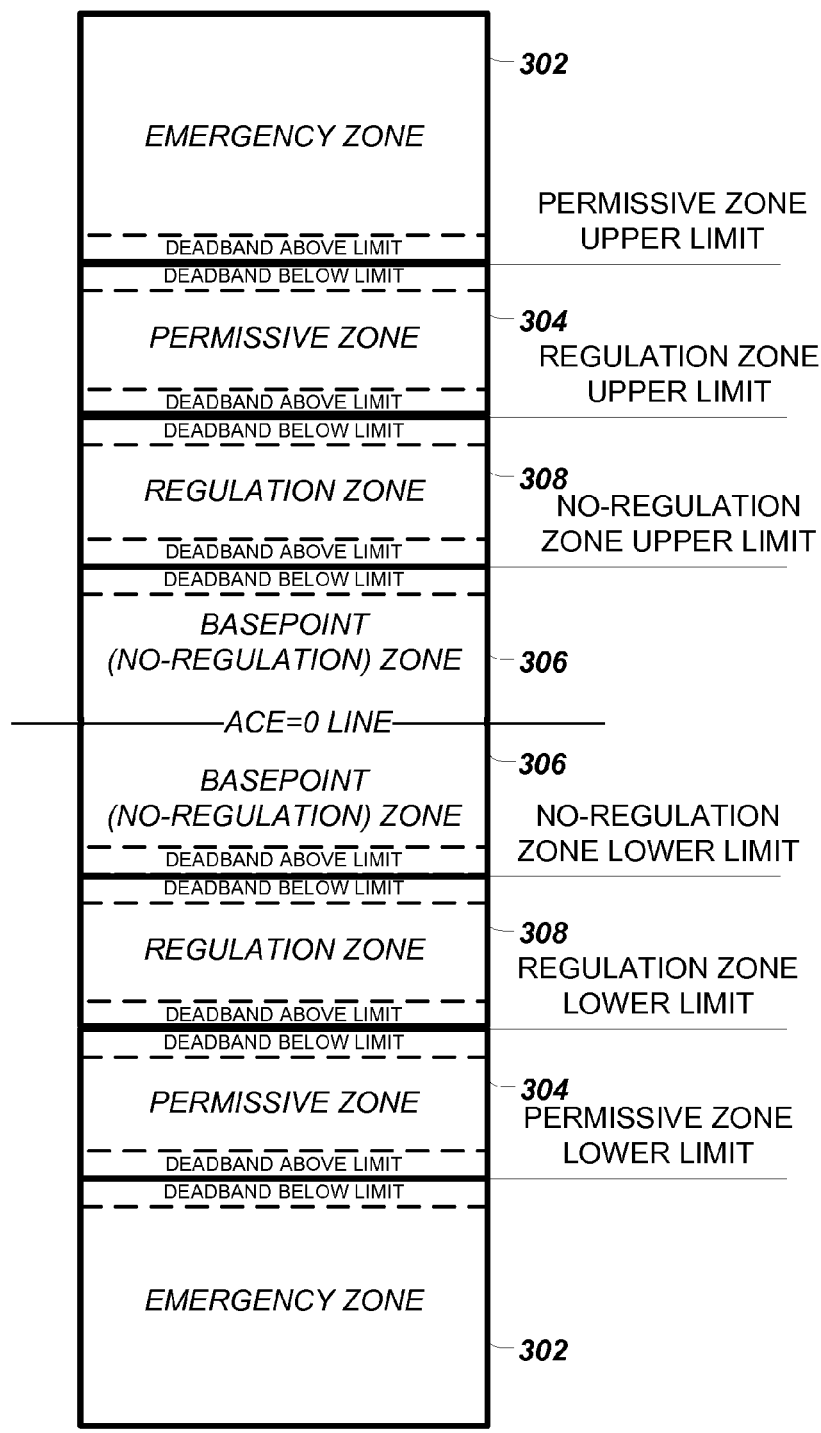
FIG. 3 is a schematic block diagram depicting an example of nested system control zones according to embodiments of the present invention.

Turning to FIG. 3, a graphical representation of these relationships is provided. Note that the System Emergency Zone 302 is beyond the System Permissive Control Zone 304; and that the system control zones going from the most inner to the most outer are System Basepoint Zone 306, System Regulation Control Zone 308, System Permissive Control Zone 304, and System Emergency Zone 302.

The Current System Control Zone module is described next. The following logic determines which system control zone the system is transitioning to based on the previous system control mode and the current ACE value.

If ACE tends to move outward from a more inner system control zone to a more outer system control zone based on the ACE values from the previous and current AGC cycles, then check:

If $BC_{min} - BC_{db} < ACE < BC_{max} + BC_{db}$, the system control mode is System Basepoint Control Mode.

If $BC_{max} + BC_{db} \leq ACE < RC_{max} + RC_{db}$ or $RC_{min} - RC_{db} < ACE \leq BC_{min} - BC_{db}$, the system control mode is System Regulating Control Mode.

If $RC_{max} + RC_{db} \leq ACE < PC_{max} + PC_{db}$ or $PC_{min} - PC_{db} < ACE \leq RC_{min} - RC_{db}$, the system control mode is System Permissive Control Mode.

If $ACE \leq PC_{min} - PC_{db}$ or $ACE \geq PC_{max} + PC_{db}$, the system control mode is System Emergency Control Mode.

If ACE tends to move inward from a more outer system control zone to a more inner system control zone based on the ACE values from the previous and current AGC cycles, then check:

If $BC_{min} + BC_{db} < ACE < BC_{max} - BC_{db}$, the system control mode is System Basepoint Control Mode.

If $BC_{max} - BC_{db} \leq ACE < RC_{max} - RC_{db}$ or $RC_{min} + RC_{db} < ACE \leq BC_{min} + BC_{db}$, the system control mode is System Regulating Control Mode.

If $RC_{max} - RC_{db} \leq ACE < PC_{max} - PC_{db}$ or $PC_{min} + PC_{db} < ACE \leq RC_{min} + RC_{db}$, the system control mode is System Permissive Control Mode.

If $ACE \leq PC_{min} + PC_{db}$ or $ACE \geq PC_{max} - PC_{db}$, the system control mode is System Emergency Control Mode.

The Advanced Proportional-Integral (PI) Control module functions as follows. At the AGC cycle when the system control mode is transitioned out of the System Basepoint Control Mode, the integral reset of the PI control is carried out. This means the integral of ACE over time in the past is discarded. When the system control mode is transitioned into and stays in the System Basepoint Control Mode, there is no area regulation required. When the system control mode is transitioned out of the System Basepoint Control Mode, the PI control takes one of the following enhanced forms depending on the system control mode:

System Emergency Control Mode: At the AGC cycle when the system control mode is transitioned into this mode, the integral reset of the PI control is carried out as the tunable parameters are different for different System Control Modes and in Emergency Control Mode the parameters allow for aggressive control. In this mode, the control objective is to bring the system back to the System Basepoint Control Mode as quickly as possible. The control has to be most aggressive. The output of the PI controller is expressed as:

$$PI_{out} = k_1 ACE + k_2 \frac{\int_{t_i} ACE \, d_t}{T_1}$$

where $k_1$ and $k_2$ are positive, tunable gains; and $T_1$ is the integration time constant which is tunable.

System Permissive Control Mode: At the AGC cycle when the system control mode is transitioned into this mode, the integral reset of the PI control is carried out. In this mode, the control objective is to bring the system back to the System Regulating Control Mode. The output of the PI controller is expressed as:

$$\begin{cases} PI_{out} = k_3(ACE - (RC_{max} - RC_{db})) + k_4 \dfrac{\int_t (ACE - (RC_{max} - RC_{db})) d_t}{T_1}, & \text{if } ACE > 0 \\ PI_{out} = k_3(ACE - (RC_{min} + RC_{db})) + k_4 \dfrac{\int_t (ACE - (RC_{min} + RC_{db})) d_t}{T_1}, & \text{if } ACE < 0 \end{cases}$$

where $k_3$ and $k_4$ are positive, tunable gains.

System Regulating Control Mode: At the AGC cycle when the system control mode is transitioned into this mode, the integral reset of the PI control is carried out. In this mode, the control objective is to bring the system back to the System Basepoint Control Mode. The output of the PI controller is expressed as:

$$\begin{cases} PI_{out} = k_5(ACE - (BC_{max} - BC_{db})) + k_6 \dfrac{\int_t (ACE - (BC_{max} - BC_{db})) d_t}{T_1}, & \text{if } ACE > 0 \\ PI_{out} = k_5(ACE - (BC_{min} + BC_{db})) + k_6 \dfrac{\int_t (ACE - (BC_{min} + BC_{db})) d_t}{T_1}, & \text{if } ACE < 0 \end{cases}$$

where $k_5$ and $k_6$ are positive, tunable gains.

System Total Desired Generation: The system desired generation is computed as the system basepoint generation total (calculated as the total sum of all unit's basepoints) minus the output of the PI controller ($PI_{out}$ as calculated in the above).

System Regulation Obligation: The system regulation is then calculated as the system total desired generation minus the system basepoint generation total.

Adjusted System Regulation Considering Load Change: The derived regulation (Re $g_{sys}$) from the above steps may be adjusted by using the incremental system load change—which may be reflected by the actual system load ramp rate. The adjusted system regulation (Re $g_{sys}^{adj}$) is computed as:

Re $g_{sys}^{adj}$=Re $g_{sys}$+RR$_{Load}$*Cycle$_{LFC}$/60 where $RR_{Load}$ designates the instantaneous system load ramp rate in MW/minute (positive when load moves up from AGC cycle to AGC cycle; negative when load moves down from AGC cycle to AGC cycle), and $Cycle_{LFC}$ is the LFC generation control cycle time in seconds. Note that there is a condition to meet in order to apply the system regulation adjustment. That is—the system regulation adjustment due to load change applies only when $RR_{Load}$ in absolute value is greater than a configurable threshold (e.g., 40 MW/min). This ensures that the significant load change, not the random fluctuation of load change is considered in the system regulation adjustment.

Adjusted System Regulation Considering Interchange Change: The similar treatment can be applied when interchange schedule ramps up or down across the hour boundary.

Figure 4:
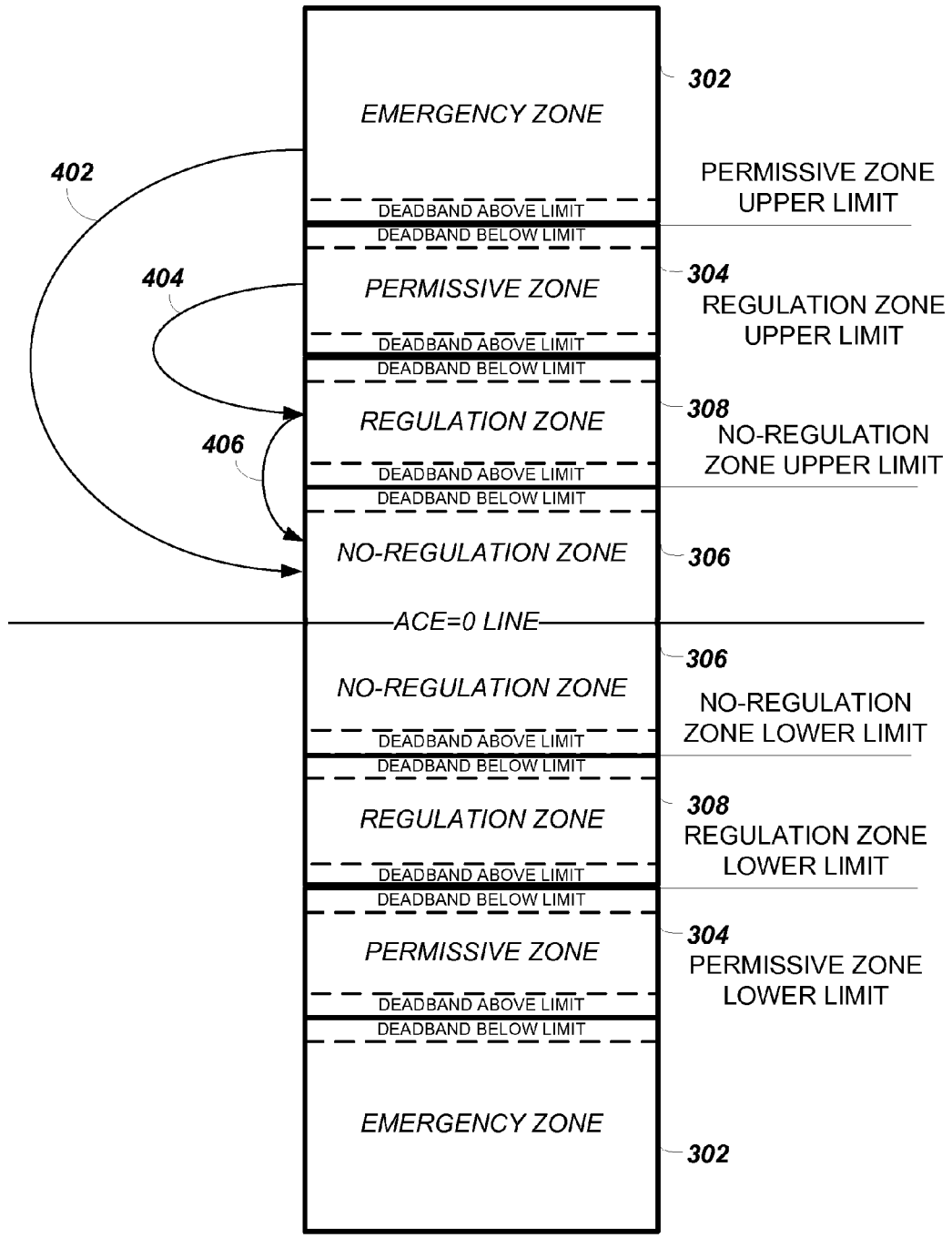
FIG. 4 graphically illustrates an example control scheme on the nested system control zones block diagram of FIG. 3 according to embodiments of the present invention.

Alternatively, a Progressive Multiple Gain Proportional Control module can be used. When the system control mode is transitioned into and stays in the System Basepoint Control Mode, there is no area regulation required. When the system control mode is transitioned out of the System Basepoint Control Mode, the proportional control takes one of the following enhanced forms depending on the system control mode:

System Emergency Control Mode: In this mode, the control objective is to bring the system back to the System Basepoint Control Mode as quickly as possible. The control has to be most aggressive. In FIG. 4, this aggressive control is represented by the large arc 402 going from the Emergency Zone 302 to the Basepoint Zone 306. The system regulation (Re $g_{sys}$) is calculated as:

Re $g_{sys}$=−$k_7$ACE where $k_7$ is a positive, tunable gain with a typical default value 1.0.

System Permissive Control Mode: In this mode, the control objective is to bring the system back to the System Regulating Control Mode. In FIG. 4, this control is represented by the medium arc 404 going from the Permissive Control Zone 304 to the Regulation Zone 308.

The system regulation (Re $g_{sys}$) is calculated as:

If ACE>0,Re $g_{sys}$=−$k_8$(ACE−($RC_{max}$−$RC_{db}$))

where $k_8$ is a positive, tunable gain with a typical default value of 0.8.

If ACE<0Re $g_{sys}$=−$k_8$(ACE−($RC_{min}$+$RC_{db}$)).

System Regulating Control Mode: In this mode, the control objective is to bring the system back to the System Basepoint Control Mode. Typically when the system is operating beyond the System Basepoint Control Mode, it is typically operating in the System Regulating Control Mode. In FIG. 4, this smooth transition is represented by the small arc 406 going from the Regulation Zone 308 to the Basepoint Zone 306. To ensure the smooth regulation, three gains are defined associated with different sub-regions of the Regulating Control Zone. The system regulation (Re $g_{sys}$) is calculated as:

If $RC_{max}$−$RC_{db}$<ACE<$RC_{max}$+$RC_{db}$, the system regulation is calculated as:

Re $g_{sys}$=−$k_8$(ACE−($BC_{max}$−$BC_{db}$))

where $k_8$ is a positive, tunable gain with a default value of 0.7.

If $BC_{max}$+$BC_{db}$<ACE<$RC_{max}$−$RC_{db}$, the system regulation is calculated as:

Re $g_{sys}$=−$k_9$(ACE−($BC_{max}$−$BC_{db}$))

where $k_9$ is a positive, tunable gain with a default value of 0.6.

If $BC_{max}$−$BC_{db}$<ACE<$BC_{max}$+$BC_{db}$, the system regulation is calculated as:

Re $g_{sys}$=−$k_{10}$(ACE−($BC_{max}$−$BC_{db}$))

where $k_{10}$ is a positive, tunable gain with a default value of 0.4.

If $RC_{min} - RC_{db} < ACE < RC_{min} + RC_{db}$, the system regulation is calculated as:

$$Re\ g_{sys} = -k_8(ACE - (BC_{min} + BC_{db}))$$

where $k_8$ is a positive, tunable gain with a default value of 0.7.

If $BC_{min} - BC_{db} < ACE < RC_{min} - RC_{db}$, the system regulation is calculated as:

$$Re\ g_{sys} = -k_9(ACE - (BC_{min} + BC_{db}))$$

where $k_9$ is a positive, tunable gain with a default value of 0.6.

If $BC_{min} - BC_{db} < ACE < BC_{min} + BC_{db}$, the system regulation is calculated as:

$$Re\ g_{sys} = -k_{10}(ACE - (BC_{min} + BC_{db}))$$

where $k_{10}$ is a positive, tunable gain with a default value of 0.4.

The Economic Allocation of Regulation module is now described. Where the system regulation is determined, it is distributed among all online participating regulating units economically. First, based on the sign of the current ACE, the biased effective limits for each potential unit that participates in regulation allocation is determined. Secondly, based on the system regulation requirement, it is known whether the regulation is upward or downward for each participating unit; and each regulating unit's maximum upward or downward regulation contribution within the normal range is calculated. If the sum of these units' maximum regulation contributions are sufficient, then only these units will be selected and the system regulation will be economically distributed among them. Otherwise, compute each regulating unit's maximum upward or downward regulation contribution in the boosted range and obtain the system total sum. If this system total sum is sufficient to meet the system regulation obligation, then only these regulating units will be selected and the system regulation will be economically distributed among them. If the total regulation contribution from all regulating units is not sufficient, then those online units designated as assisted regulating units will be included for economic allocation of system regulation which respects each participating unit's effective limits, which automatically ensures that these units' movements reduce ACE. These steps are carried out as follows:

Biased Effective Limits Calculation: Based on the sign of ACE, the unit's effective high and low effective limits (which must be positive) are computed as follows:

If ACE>0, then Effective Low (EffLim$_{Low}^i$) and High (EffLim$_{High}^i$) Limits are calculated as:

$$EffLim_{High}^i = \min(P_{act}^i, BP^i)$$

where $P_{act}^i$ and $BP^i$ designate the ith unit's actual MW output and basepoint, respectively.

$$EffLim_{Low}^i =$$

$$EffLim_{High}^i - \max\left(0, \min\left(EffLim_{High}^i - Re\ gLim_{Low}^i, \frac{RR_{Down}^i * Cycle_{LFC}}{60}\right)\right)$$

where Re gLim$_{Low}^i$, RR$_{Down}^i$, Cycle$_{LFC}$ designate the ith unit's low regulating limit, downward ramp rate (positive; in MW/Min), and the LFC's generation control cycle time, respectively.

If ACE<0, then Effective Low (EffLim$_{Low}^i$) and High (EffLim$_{High}^i$) Limits are calculated as:

$$EffLim_{Low}^i = \max(P_{act}^i, BP^i).$$

$$EffLim_{High}^i =$$

$$EffLim_{Low}^i + \max\left(0, \min\left(Re\ gLim_{High}^i - EffLim_{Low}^i, \frac{RR_{Up}^i * Cycle_{LFC}}{60}\right)\right)$$

where Re gLim$_{High}^i$ and RR$_{Up}^i$ designate the ith unit's high regulating limit and upward ramp rate (positive; in MW/Min), respectively.

The economic allocation of regulation respects the unit's effective limits and therefore automatically guarantees that the unit's movements due to regulation will be helping reduce ACE.

Units for Regulation Participation: Identify the list of online units that can be included for economic allocation of regulation. Identify the list of online participating regulating units that have normal regulating ranges specified. If ACE>0, only the unit's downward normal regulating range is relevant; if ACE<0, only the unit's upward normal regulating range is relevant. Each unit's relevant normal regulating range is restricted by the unit's effective limit range (calculated as $$EffLim_{High}^i - EffLim_{Low}^i$$

for upward regulation;

$$EffLim_{Low}^i - EffLim_{High}^i$$

for downward regulation). If the sum total of all the regulating unit's restricted relevant normal regulating range is sufficient to meet the system regulation obligation, then these units will be included for economic allocation of system regulation.

Else check if the sum total of all the regulating unit's relevant effective limit ranges (calculated as $$EffLim_{High}^i - EffLim_{Low}^i$$

for upward regulation;

$$EffLim_{Low}^i - EffLim_{High}^i$$

for downward regulation) is sufficient to meet the system regulation obligation. If so, then all the regulating units will be included in the economic allocation of system regulation.

Otherwise all the regulating units and the assisted regulating units will be included.

System Desired Generation: The final system desired generation is computed as the sum total of the basepoints of the above identified online units plus the final system regulation determined in the above.

Optimal Regulation Allocation: The system desired generation is economically dispatched among the above selected regulating units (and assisted regulating units if required) by using the newly introduced core optimization engine embedded in the LFC module. As the results of the optimization process, the desired generation for each participating unit is computed for the best economics; and the regulation assigned on each participating unit is computed as the unit's optimized desired generation minus the unit's basepoint.

In some embodiments of the present invention, the improved ED module provides a number of novel features. A System Generation To Be Dispatched module can be included. The total system generation to be dispatched (GTBD) is calculated as the sum of the system total basepoint plus the system regulation. Since not all the units are placed on Economic Dispatch mode all the time for whatever operation reasons, only the sum of the unit's basepoint for those participating economic units is relevant. For the conciseness and convenience of discussion without loss of generalization, all the online units are participating in the Economic Dispatch (or otherwise all the sum totals will be adjusted to only reflect those online economic units and generation dispatch is only limited to those online economic units). The generation to be dispatched will be economically distributed among these economic units.

System Regulation Adjustment: The system regulation is determined in the above described functions: Advanced Proportional-Integral (PI) Control and Alternatively, Progressive Multiple Gain Proportional Control.

Adjusted System Regulation Considering Load Change: The derived are regulation (Re $g_{sys}$) from the above functions may be adjusted by using the incremental system load change, which may be reflected by the actual system load ramp rate. The adjusted system regulation (Re $g_{sys}^{adj}$) is computed as:

$$\text{Re } g_{sys}^{adj} = \text{Re } g_{sys} + RR_{Load} * Cycle_{ED}/60$$

where $RR_{Load}$ designates the system load ramp rate in MW/minute (positive when load moves up from AGC cycle to AGC cycle; negative when load moves down from AGC cycle to AGC cycle), and $Cycle_{ED}$ the ED generation dispatch cycle time in seconds. Note that $Cycle_{ED}$ is typically many times greater than $Cycle_{LFC}$. Also note that there is a condition to meet in order to apply the system regulation adjustment. That is, the system regulation adjustment due to load change applies only when $RR_{Load}$ in absolute value is greater than a configurable threshold (e.g., 40 MW/min). This ensures that the significant load change, not the random fluctuation of load change is considered in the system regulation adjustment.

Note that the Adjusted System Regulation Considering Load Change for Economic Dispatch is different than Adjusted System Regulation Considering Load Change for regulation allocation due to the cycle time difference between LFC and ED.

Adjusted System Regulation Considering Interchange Change: A similar treatment can be applied when interchange schedule ramps up or down across the hour boundary.

Units Participation in Economic Dispatch: Only online units that are flagged for participating in Economic Dispatch and controlled by AGC are included.

Biased Effective Limits Calculation: The economic dispatch of system total generation respects the unit's effective limits (as calculated below) and therefore automatically guarantees that the unit's basepoint movements will be helping reduce ACE, but such a treatment is only applicable to the cases in which the system control mode is in System Regulating Control Mode, System Permissive Control Mode, or System Emergency Mode. When the system control mode is System Basepoint Control Mode, such a treatment based on the sign of ACE is not applied so that some units can move up while other units move down to achieve the best system economics. Based on the sign of ACE, the unit's effective high and low effective limits (which must be positive) are computed as follows:

If ACE>0, then Effective Low ($\text{EffLim}_{Low}^i$) and High ($\text{EffLim}_{High}^i$) Limits are calculated as:

$$\text{EffLim}_{High}^i = \min(P_{act}^i, BP^i)$$

where $P_{act}^i$ and $BP^i$ designate the ith unit's actual MW output and basepoint, respectively.

$$\text{EffLim}_{Low}^i =$$
$$\text{EffLim}_{High}^i - \max\left(0, \min\left(\text{EffLim}_{High}^i - \text{Re } g\text{Lim}_{Low}^i, \frac{RR_{Down}^i * Cycle_{ED}}{60}\right)\right)$$

where $\text{Re } g\text{Lim}_{Low}^i$, $RR_{Down}^i$, $Cycle_{LFC}$ designate the ith unit's low regulating limit, downward ramp rate (positive; in MW/Min), and the LFC's generation control cycle time, respectively.

If ACE<0, then Effective Low ($\text{EffLim}_{Low}^i$) and High ($\text{EffLim}_{High}^i$) Limits are calculated as:

$$\text{EffLim}_{Low}^i = \max(P_{act}^i, BP^i).$$
$$\text{EffLim}_{High}^i =$$
$$\text{EffLim}_{Low}^i + \max\left(0, \min\left(\text{Re } g\text{Lim}_{High}^i - \text{EffLim}_{Low}^i, \frac{RR_{Up}^i * Cycle_{ED}}{60}\right)\right)$$

where $\text{Re } g\text{Lim}_{High}^i$ designate the ith unit's high regulating limit and upward ramp rate (positive; in MW/Min), respectively.

Note that the unit's Effective Low and High Limits for Economic Dispatch are different than the unit's Effective Low and High Limits for regulation allocation due to the cycle time difference between the LFC module and the ED module.

Optimal Basepoint Dispatch: The system desired generation is economically dispatched among the above selected economic units by using the existing Siemens Spectrum optimization engine. As the results of the optimization process, the desired generation for each participating unit is computed for the best economics; and the basepoint is economically assigned on each participating unit.

The enhanced LFC application utilizes the real-time operational database for fast data I/O. The following data elements can be used for economic allocation of system regulation. Static input data can include incremental heat rate (IHR) curves for thermal units; incremental water rate (IWR) curves for hydro units; unit incremental maintenance cost; and the like. Dynamic input data can include real-time measurements, schedules, calculated values and user input data. In addition, data retrieved from the operational AGC database of the EMS can include the Unit output (MW), Area ACE, System Control Mode, System regulation, Unit basepoint (MW), Unit connection status, Unit derated limits, Unit operating limits, Unit regulating ranges, Unit operating mode, Unit ramp rates, IHR curves and IWR curves selectors, Unit fuel selectors, Unit fuel cost, Unit penalty factors, Control area's current load, Control area's current net interchange, Control area's reserve requirements, and the like. The schedule data can include Area net interchange schedules, Area load forecast, Unit schedules, and the like. Working data that has been pre-processed by the LFC application to set up the formulation of the optimization model can be used. Output data resulting from solving the optimization problem and Regulation Optimization engine post-processing can be used including the optimal economic regulation of all the participating regulating units, which also gets updated to the AGC real-time operational database.

For cyclic ED module execution, the process is similar. The ED module however does not include regulation allocation. The ED module does takes into account the area total generation to be dispatched which has a component of regulation. Also, the ED module does include the list of only economically dispatchable generating units and, after optimization, the ED module produces the optimal economic basepoints for all the participating ED units.

In some embodiments, the improved LFC module can be implemented in two parts. The first part is a LFC application that does data pre-processing and prepares data in a form that can be accepted by the Regulation Optimization engine. The LFC application also obtains the solution results from the Regulation Optimization engine, performs post-processing, and stores the results into the operational database for implementation as regulation corrections. The second part is the Regulation Optimization Engine. This part includes the functions described in detail above and which are callable from within the LFC application. The Regulation Optimization Engine receives various input data, computes optimal control solutions, and stores the solution results into the LFC application supplied output data structures.

In some embodiments, the improved ED module can be implemented in two parts. The first part is an ED application that does data pre-processing and prepares data in a form that can be accepted by the Basepoint Optimization engine. The ED application also obtains the solution results from the Basepoint Optimization engine, performs post-processing, and stores the results into the operational database for implementation as economic basepoints for all the participating ED units. The second part is the Basepoint Optimization Engine. This part includes the functions described in detail above and which are callable from within the ED application. The Basepoint Optimization Engine receives various input data, computes optimal economic basepoints, and stores the solution results into the ED application supplied output data structures.

Figure 5:
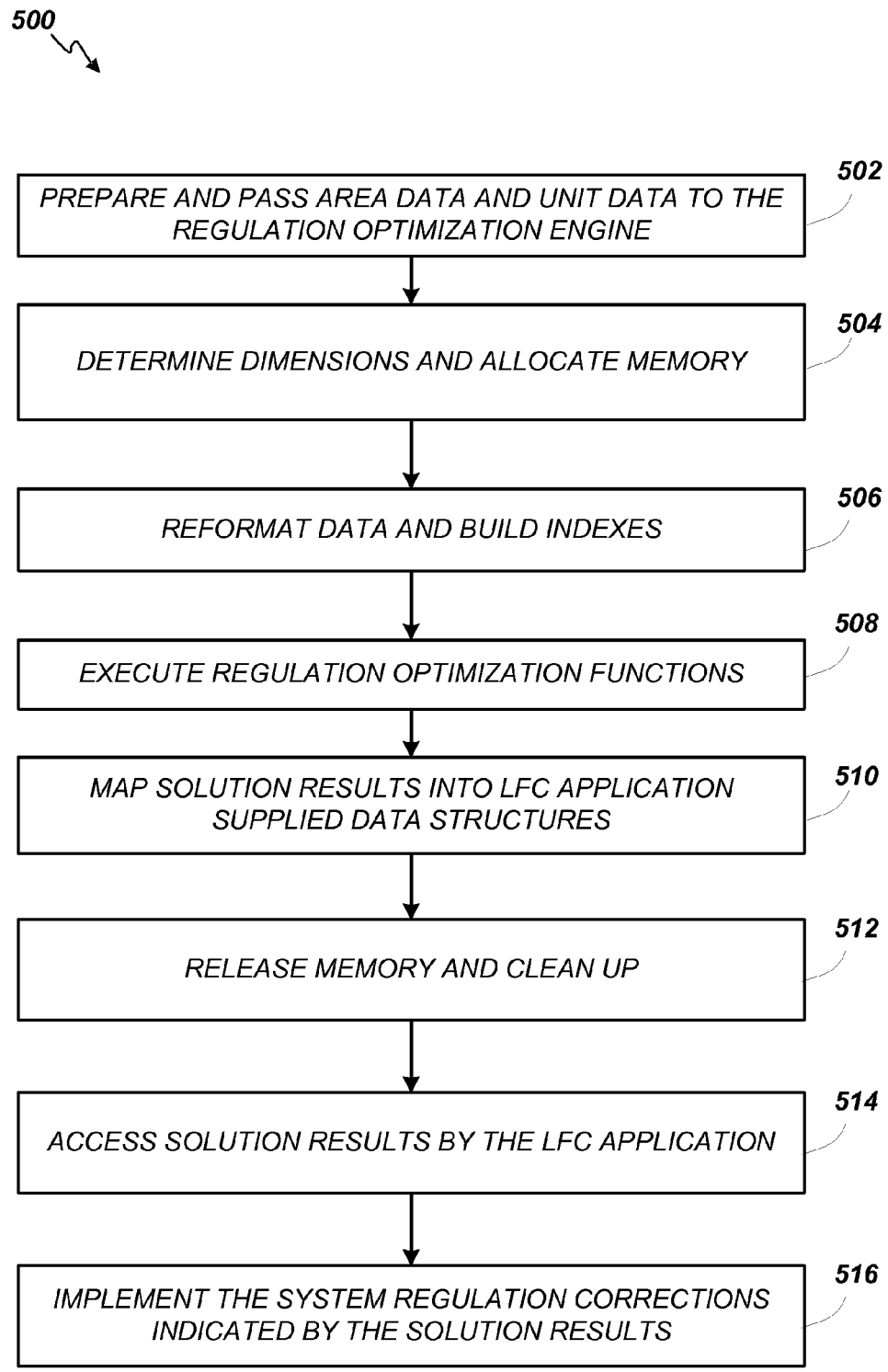
FIG. 5 is a flowchart depicting a first example method according to embodiments of the present invention.

Turning now to FIG. 5, an example method 500 of controlling an energy delivery system according to embodiments of the invention is depicted in a flow chart. Within an AGC system of an EMS, an LFC module prepares and passes area data and unit data to a Regulation Optimization engine that implements the above described control functions (502). The data can be retrieved from the real-time AGC operational database and includes the static and dynamic input data described above. The Regulation Optimization engine determines and allocates the memory needed (504), and then reformates the data into useable arrangements and builds any needed indexes (506). Next, the appropriate functions within the Regulation Optimization engine are executed using the input data (508). The Regulation Optimization engine maps the resulting solution into output data structures provided by the LFC application (510). The Regulation Optimization engine releases the memory it used and cleans up (e.g., resets for subsequent executions) (512). The LFC Application accesses the solution results in the output data structures (514) and indicates the system regulation corrections to be made by the AGC based on the solution results, for example, by storing the solution results in the operational database (516).

Figure 6:
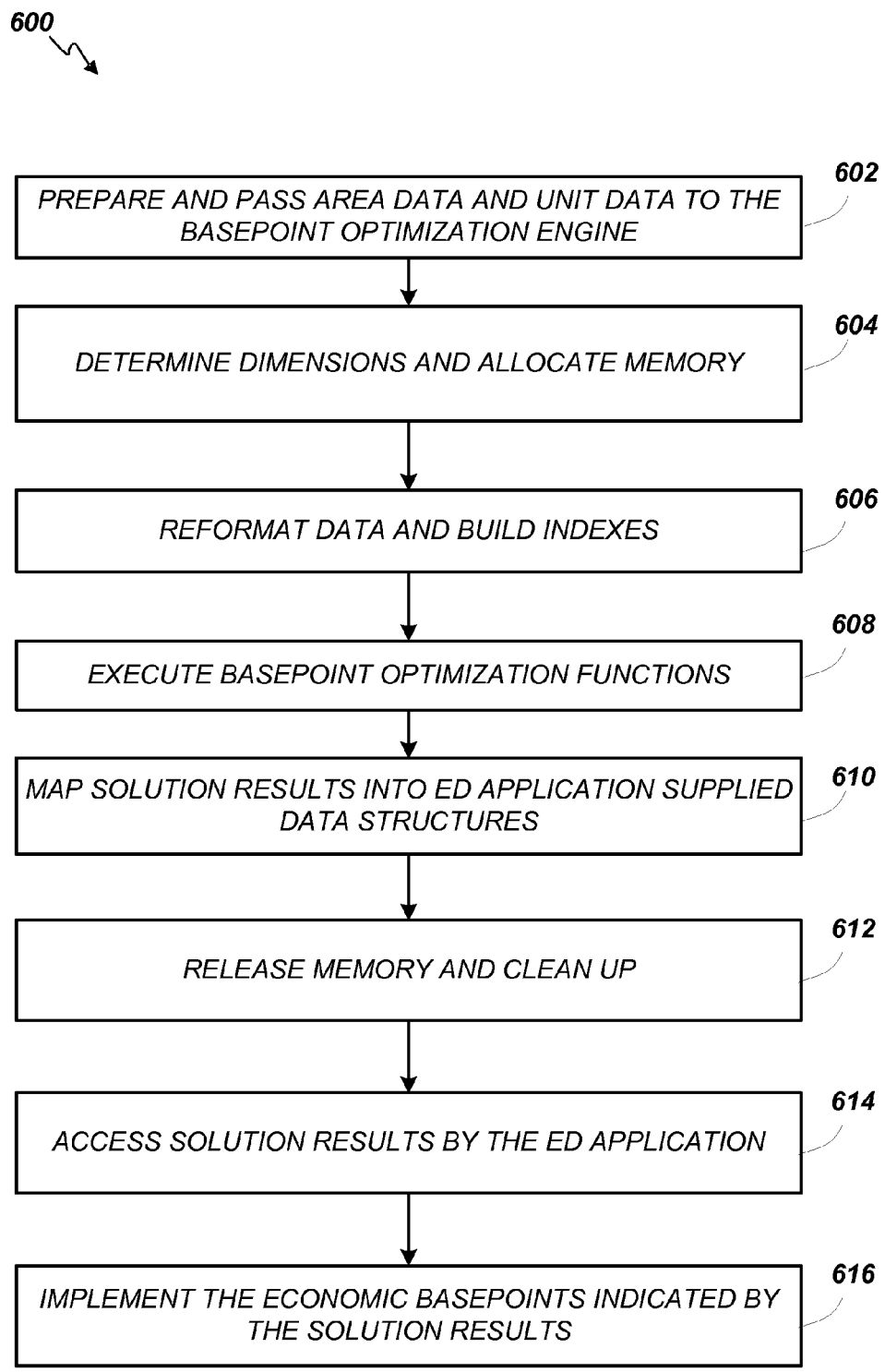
FIG. 6 is a flowchart depicting a second example method according to embodiments of the present invention.

Turning now to FIG. 6, an example method 600 of controlling an energy delivery system according to embodiments of the invention is depicted in a flow chart. Within an AGC system of an EMS, an ED application prepares and passes area data and unit data to a Basepoint Optimization engine that implements the above described control functions (602). The data can be retrieved from the real-time AGC operational database and includes the static and dynamic input data described above. The Basepoint Optimization engine determines and allocates the memory needed (604), and then reformates the data into useable arrangements and builds any needed indexes (606). Next, the appropriate functions within the Basepoint Optimization engine are executed using the input data (608). The Basepoint Optimization engine maps the resulting solution into output data structures provided by the ED application (610). The Basepoint Optimization engine releases the memory it used and cleans up (e.g., resets for subsequent executions) (612). The ED Application accesses the solution results in the output data structures (614) and indicates the optimal economic basepoints for all the participating ED units based on the solution results, for example, by storing the solution results in the operational database (616).

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of controlling an energy delivery system including a process controller, an information network, and a generating resource, the method comprising:
providing an energy management system (EMS) having an automatic generation control (AGC) system including a load frequency control (LFC) module and an economic dispatch (ED) module;
receiving input data from the information network, the input data including real-time measurements;
determining a regulation requirement based upon a predefined set of nested system control zones and a current area control error (ACE);
determining a regulation allocation based on a pre-defined set of gain factors associated with the predefined set of nested system control zones; and
transmitting control information via the information network; and
modifying an operation of the energy delivery system based at least in part upon the control information;
wherein the control information is based upon solution results of the determined regulation allocation.

2. The method of claim 1, wherein the predefined set of nested system control zones include a no-regulation zone, a regulation zone, a permissive zone, and an emergency zone.

3. The method of claim 2, wherein when the ACE is within the no-regulation zone, a system generation is entirely dispatched, no regulation is required, and no regulation is allocated.

4. The method of claim 2, wherein when the ACE is within the regulation zone, active power regulation is applied to progressively move one or more units of a plurality of units to bring the system to a desired system condition.

5. The method of claim 2, wherein when the ACE is within the permissive zone, active power regulation is applied to progressively move one or more units of a plurality of units to bring the system to a desired system condition but any movements that deteriorate the ACE are blocked.

6. The method of claim 2, wherein a gain factor associated with the emergency zone is tuned to bring the energy delivery system back to the no-regulation zone in a minimum amount of time.

7. The method of claim 2, wherein a gain factor associated with the permissive zone is tuned to bring the energy delivery system back to the regulation zone.

8. The method of claim 2, wherein a gain factor associated with the regulation zone is tuned to bring the energy delivery system back to the no-regulation zone.

9. An energy management system (EMS) comprising:
a process controller;
an information network coupled to the process controller;
a memory coupled to the process controller, the memory having stored therein a plurality of instructions readable and executable by the process controller, and when executed by the process controller, one or more of the plurality of instructions causes the energy management system to:
receive, from an information network, input data including real-time measurements;
determine a regulation requirement based upon a predefined set of nested system control zones and a current area control error (ACE);
determine a regulation allocation based on a pre-defined set of gain factors associated with the predefined set of nested system control zones; and
transmit control information via the information network;
modify the operation of an energy delivery system based at least in part upon the control information;
wherein the control information is based upon solution results of the determined regulation allocation.

10. The EMS of claim 9, wherein when executed by the process controller one or more instructions of the plurality of instructions further cause the process controller to define the nested system control zones to include a no-regulation zone, a regulation zone, a permissive zone, and an emergency zone.

11. The EMS of claim 10, wherein when executed by the process controller, one or more instructions of the plurality of instructions further cause a system generation to be entirely dispatched, no regulation to be required, and no regulation to be allocated when the ACE is within the no-regulation zone.

12. The EMS of claim 10, wherein when executed by the process controller, one or more instructions of the plurality of instructions further cause an active power regulation to be applied to progressively move one or more units of a plurality of units to bring the energy delivery system to a desired system condition when the ACE is within the regulation zone.

13. The EMS of claim 10, wherein when executed by the process controller, one or more instructions of the plurality of instructions further cause an active power regulation to be applied to progressively move one or more units of a plurality of units to bring the energy delivery system to a desired system condition but any movements that deteriorate the ACE are blocked when the ACE is within the permissive zone.

14. The EMS of claim 10, wherein a gain factor of the predefined set of gain factors associated with the emergency zone is tuned to bring the energy delivery system back to the no-regulation zone.

15. The EMS of claim 10, wherein a gain factor of the predefined set of gain factors associated with the permissive zone is tuned to bring the energy delivery system back to the regulation zone.

16. The EMS of claim 10, wherein a gain factor of the predefined set of gain factors associated with the regulation zone is tuned to bring the energy delivery system back to the no-regulation zone.

* * * * *